Nov. 25, 1941.   H. H. MOORE ET AL   2,263,585
FLOAT LIGHT AND SMOKE BOMB
Filed June 7, 1938   3 Sheets-Sheet 1
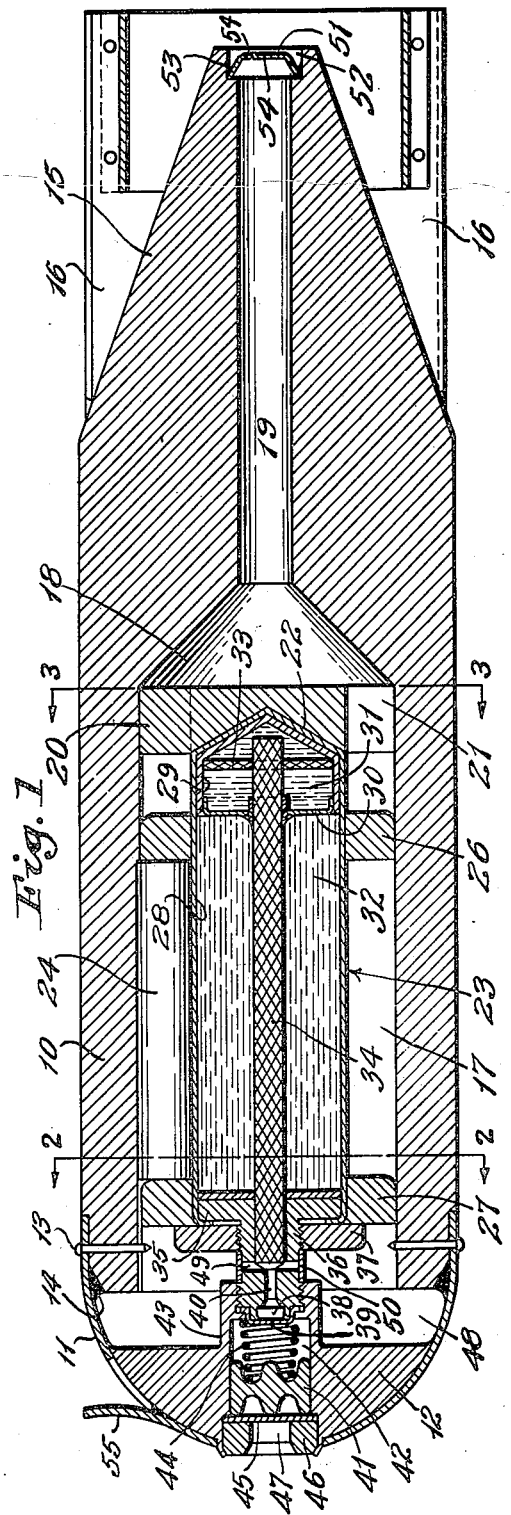
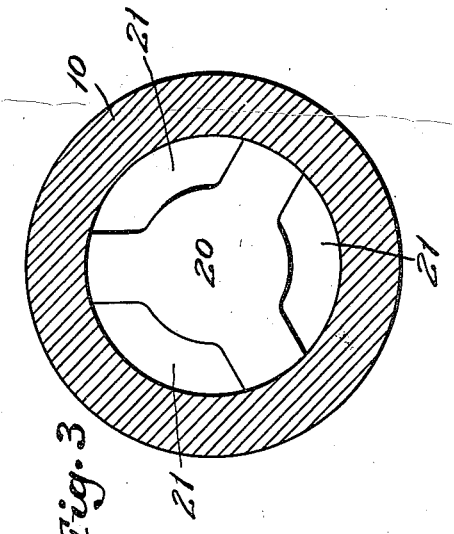
Fig. 3
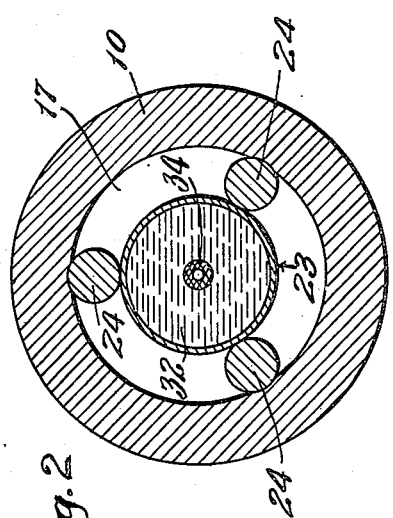
Fig. 2
Inventors:
H. H. Moore
G. B. Dobyns.
by Ransom H. Davis
Attorney Nov. 25, 1941.    H. H. MOORE ET AL    2,263,585
FLOAT LIGHT AND SMOKE BOMB
Filed June 7, 1938    3 Sheets-Sheet 2
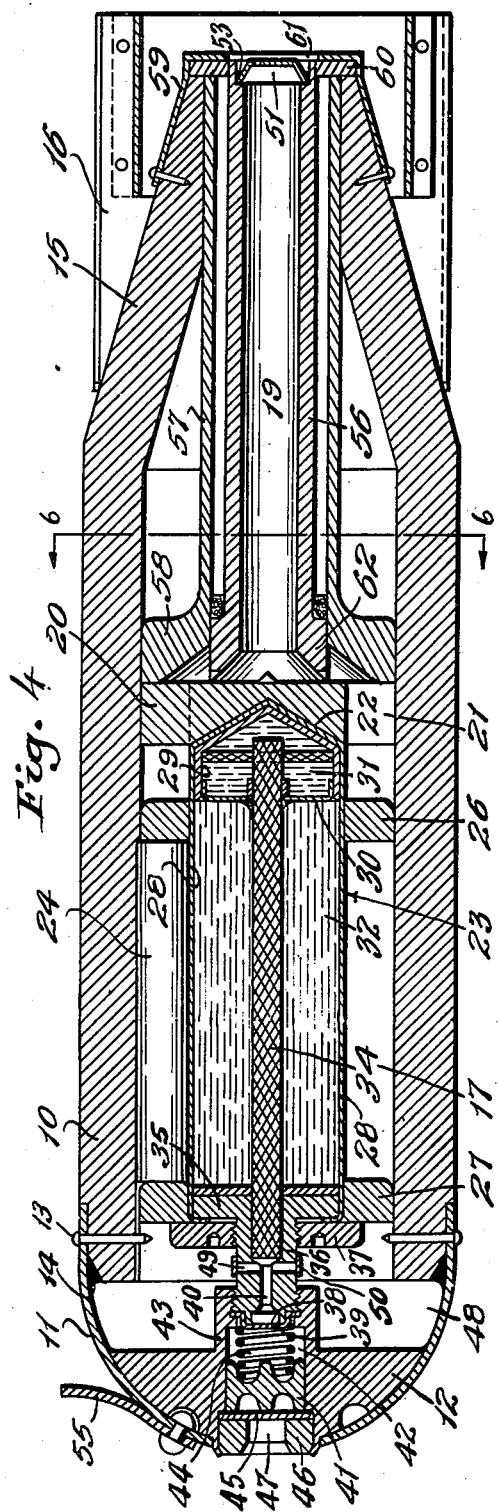
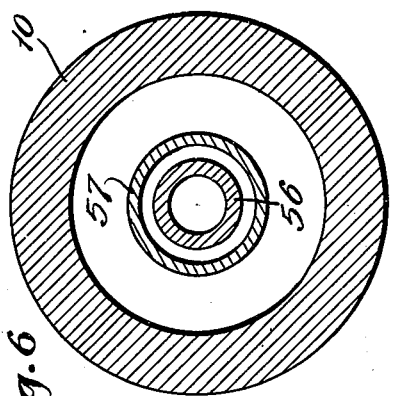
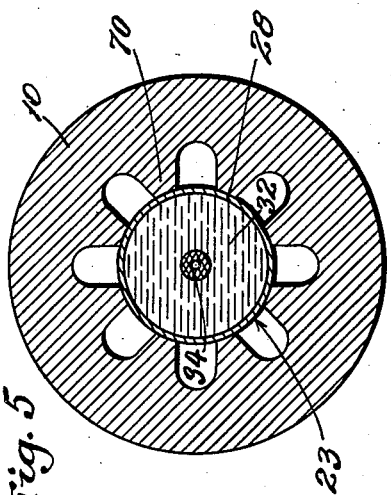
Inventors:
H. H. Moore
G. B. Dobyns
by
Attorney Nov. 25, 1941.   H. H. MOORE ET AL   2,263,585
FLOAT LIGHT AND SMOKE BOMB
Filed June 7, 1938   3 Sheets-Sheet 3
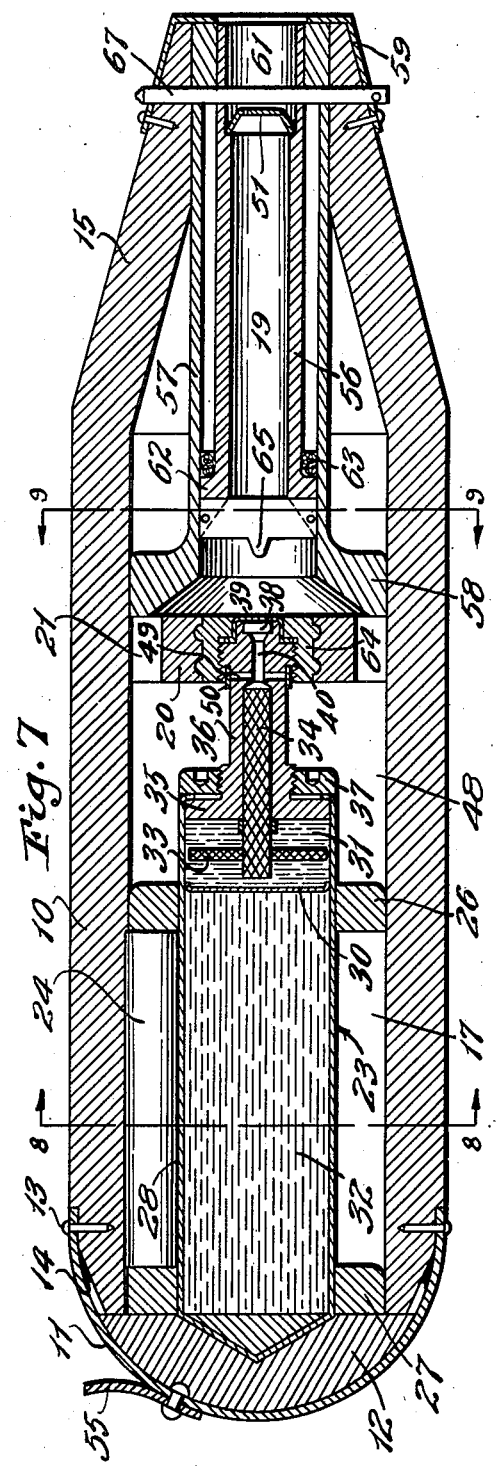
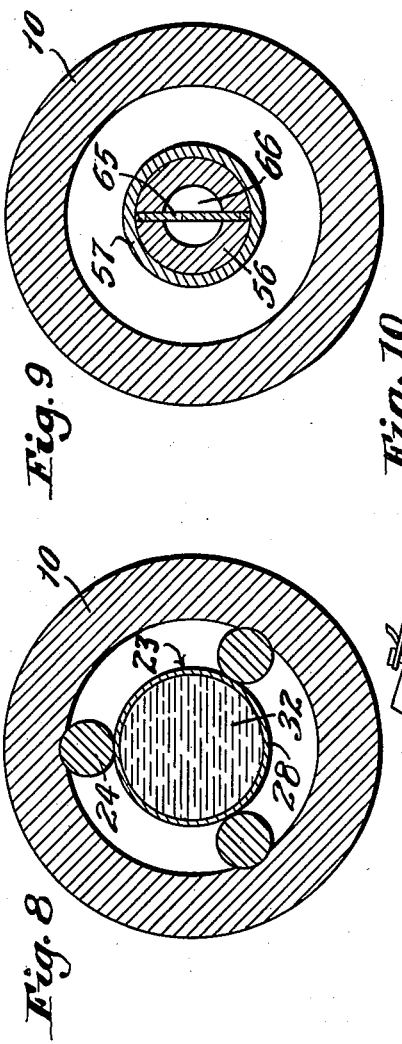
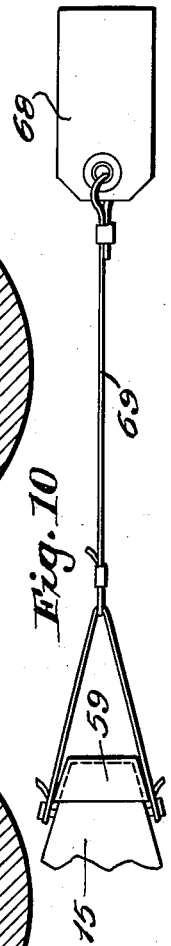
Inventors:
H. H. Moore
G. B. Dobyns
by Ramon K. Davis
Attorney Patented Nov. 25, 1941

2,263,585

UNITED STATES PATENT OFFICE 2,263,585

FLOAT LIGHT AND SMOKE BOMB

Harry H. Moore, Washington, D. C., and George B. Dobyns, Bushnell, Fla.

Application June 7, 1938, Serial No. 212,305

2 Claims. (Cl. 102—2)

(Granted under the act of March 3, 1883, as amended April 30, 1928; 370 O. G. 757)

The present invention relates to improvements in float lights and smoke bombs which are adapted to be dropped from an aircraft and which will float upon the surface of water to give a signal light, a smoke screen or a toxic vapor, according to the ingredients contained therein.

The principal object of this invention is the provision of a float bomb of the character described which may be relied upon to function as intended when the water is rough and in which the ignition and uniform burning of the pyrotechnic pellet or cartridge will be insured.

Another object of the invention is the provision of a float bomb of the character described having an extensible element for automatically elevating the opening through which the signal or other gases escape a sufficient distance above the water line to preclude the entrance of water.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawings, means for carrying the invention into practical use, without limiting the improvements in their useful application to the particular construction, which, for the purpose of explanation, have been made the subject of illustration.

In the accompanying drawings:

Fig. 1 is a longitudinal sectional view through a float light and smoke bomb embodying the invention;

Fig. 2 is a transverse sectional view taken on line 2—2 of Fig. 1;

Fig. 3 is a similar view taken on line 3—3 of Fig. 1;

Fig. 4 is a longitudinal sectional view of another embodiment of the invention;

Fig. 5 is a transverse sectional view showing another form of spacing means;

Fig. 6 is a similar view taken on line 6—6 of Fig. 5;

Fig. 7 is a longitudinal sectional view of still another form of the invention;

Fig. 8 is a transverse sectional view taken on line 8—8 of Fig. 7;

Fig. 9 is a similar view taken on line 9—9 of Fig. 7; and

Fig. 10 is a detail elevational view of a card stabilizing device or streamer for guiding the bomb while in flight.

Referring to the drawings, and particularly to Figs. 1 to 3 thereof, a float light and smoke bomb constructed in accordance with the present invention is shown as comprising a cylindrical body 10 preferably constructed of light wood of a size to obtain the desired buoyancy. A metallic nose cap 11, containing a weight 12, is secured to one end of the body 10 by nails 13 and sealed at its juncture therewith by a suitable compound 14. The body 10 is formed with a conical tail portion 15 to which a plurality of stabilizing fins 16 are secured, which, together with the weight 12, insure a vertical position in flight when the bomb is launched from an aircraft. The body 10 is formed with a cylindrical chamber 17 which communicates through a conical recess 18 with a bore 19 of smaller diameter extending coaxially through the conical tail portion 15 of the bomb.

An end block 20 formed with a plurality of passages 21 therethrough is disposed within the chamber 17 in abutting engagement with the shoulder formed by the conical recess 18 and is provided with a conical depression 22 in which one end of a pyrotechnic pellet or cartridge 23 is seated. This pellet is maintained in axially spaced relation to the wall of the chamber 17 by means of a plurality of circumferentially spaced rods 24 which frictionally engage the wall of the chamber and the pellet 23 and are held against endwise movement by sealing rings 26 and 27 located adjacent to each end of the pellet. The rods 24 not only hold the pellet 23 in spaced relation to the body 10 so as to minimize absorption of moisture therefrom, but support the side walls of the pellet against collapse and hold the pellet in a centrally located position.

The pyrotechnic pellet or cartridge 23 comprises a thin walled container 28, the tail end of which houses a starter cup 29 of moulded Bakelite or the like, closed at one end by a thin cover member 30 of combustible material and containing a hot burning starting chemical 31 which is thus held in intimate contact with the end of the relatively slow burning pyrotechnic pellet 32 in the main portion of the container. A quick match 33 of usual construction is embedded in the starter for igniting the same and is itself ignited by means of a slow burning time fuse 34 which extends axially through the pyrotechnic pellet 32 and starter 31. The ring 26 is of combustible material which is consumed during the burning of the pyrotechnic pellet but which, during the first or ignition stage, prevents the fused starting substance from running down the sides of the pellet and igniting the same at points below its top, thus preventing premature and excessive combustion. The opposite or nose end of the pyrotechnic pellet is closed by a metallic disc 35 around the edges of which the end of the container 28 is crimped.

The Bakelite cup 29, which is heat resistant but not highly refractory, serves to hold the starter intact and closely in contact with the pyrotechnic pellet 32, while the Celluloid disc or quick starter 33, being highly inflammable, quickly burns away and insures a close contact between the exceedingly hot starter and the end of the pyrotechnic pellet. By the time an effective reaction is established in the pyrotechnic pellet proper the Bakelite cup has charred away and presents no obstruction to the free egress of gases. Also, the thin wall 25 of the container and the sealing ring 26 will disintegrate to permit the pyrotechnic pellet to burn down uniformly after becoming properly ignited. The disc 35 is formed with a central screw threaded nipple 36 on which a nut 37 is threaded for clamping engagement with the inturned edges of the container and is bored to receive the end of the fuse 34. The nipple 36 is also provided with an anvil 38 upon which a primer 39 is seated and which communicates with the end of the fuse 34 through a passageway 40.

The primer 39 is detonated by means of a firing pin 41 which is mounted for sliding movement in a bore 42 in the weight 12. The weight is formed with an axially disposed portion 43 which is threaded onto the nipple 36 and which holds the primer 39 in place. The firing pin 41 is normally urged outwardly by a coil spring 44 but is prevented from becoming displaced from the bore 42 or from being actuated accidentally by a frangible disc 45 which closes the nose end of the bore and is held in place by a plug 46. This plug is, in turn, held in place by the inwardly swaged edges of an opening in the nose cap 11 through which it projects and is provided with a central opening 47 through which water, upon impact, exerts a pressure upon the disc sufficient to break the same and actuate the firing pin 41. The particular detonating mechanism just described forms no part of the present invention.

It sometimes occurs that the detonation of the primer upon impact explodes the time fuse and shatters the pyrotechnic pellet. This is avoided in the present construction by providing an expansion chamber 48 between the weight 12 and the sealing disc 27 which communicates with the passageway 40 through ports 49 in the nipple 36. These passageways are sealed by a frangible substance 50, such as adhesive tape, which can be ruptured in the event of excess pressure so as to permit the gases to escape into the expansion chamber 48.

The outer end of the bore 19 is normally closed by a cap 51 which is secured within a recess 52 by means of a sealing compound 53 which is quite strong at ordinary temperatures but which softens when subjected to heat. The cap 51 is provided with a plurality of small holes 54 of such size as to exclude water during submergence when internal gas pressure is developing due to the detonation of the primer, which occurs at the instant of impact, and the burning of the time fuse 34. The rate of burning of the fuse is so graduated as to cause the ignition of the starter 31 at about the time the float light returns to the surface of the water. Thus, during the few seconds required for the burning of the starter there will be a slight flow of heated gases through the small holes 54 in the end cap 51 which are in close proximity to the sealing compound 53. As a result, this compound becomes sufficiently softened by the time that the pyrotechnic pellet proper is ignited to become dislodged by the gases generated thereby, thus providing an unobstructed passage for the signal producing gases.

The utility of the float light is enhanced by insuring a short interval between the time of launching and the display of the signal, and this interval consists of the time of flight of the bomb from the plane to the water and the time between impact and detonation of the primer 39 and the ignition of the pyrotechnic pellet. This second interval cannot be less than the time of submergence. In order, therefore, to hasten the return of the bomb to the surface of the water, the bomb is provided with one or more fins or deflectors 55, which act as water brakes to limit the depth the bomb submerges and also permit of its successful use in shallower water. These deflectors may be struck outwardly from the material of the nose cap, as shown in Fig. 1, or they may be made from a separate piece and secured thereto, as shown in Figs. 4 and 7.

The production of a given volume of signal and its duration are dependent upon the quantity of pyrotechnic pellets employed, which, in turn, requires a certain minimum positive buoyancy. At the same time the value of the float light to an aviator is enhanced by small size and weight. Furthermore, low buoyancy and rough water increase the probability of failure of the signal by prolonged bobbing up and down which will, at intervals, carry the discharge end of the bore 19 beneath the surface of the water. This disadvantage is overcome by means of the construction shown in Fig. 4 in which the bore 19 which communicates with the chamber 17 is formed in an extender tube 56 which is slidably mounted in a second tube 57 fixed in the tail portion 15 of the bomb. One end of the tube 57 is formed with a head 58 which engages the side wall of the body 10 and is prevented from endwise movement by a tail cap 59 secured to the end of the conical body portion 15 and by an interposed washer or packing 60. In this particular construction the closure cap 51 is seated in a recess 61 formed in the outer end of the extender 56. The inner end of the tube 56 is formed with a plunger 62 and is provided with a packing washer 63 of felt or the like for frictional contact with the wall of the tube 57 to retard its sliding movement. In other particulars the construction shown in Fig. 4 is similar to that hereinabove described. When the bomb strikes the water and detonates, the primer and the pyrotechnic pellet commence to burn the resultant gases first, acting on the plunger 62, force the tube outwardly until its movement is arrested by the engagement of the plunger with the washer 60. This elevates the end of the bore 19 a substantial distance above the water line of the float bomb where the exclusion of water, even in rough weather, is reasonably assured. Moreover, this construction permits of a reduction in the overall length of the float bomb.

In Figs. 7 to 10 inclusive, there is shown still another form of the invention in which the primer is detonated by the extender tube 56 before it is forced outwardly by the pyrotechnic gases.

In this construction the nipple 36, containing the time fuse 34, is threaded into a block 64 which is, in turn, threaded into the end block 20 and clamps the primer 39 in position in axial alignment with a firing pin 65 fixed to the inner end of the extender tube 56. The firing pin is in the form of a plate seated edgeways in the end of the extender tube 56 so as to provide semi-circular openings 66 on each side thereof (Fig. 9) through which the pyrotechnic gases may enter the tube. The construction and operation of the fuse, quick match and starter are the same as hereinbefore described, except that the position of the ports is reversed. The extender tube is locked in a safety position by means of a pin 67 extending through the tube and the body 15 and which must be withdrawn manually prior to launching.

If desired, the stabilizing fins 16 may be dispensed with and a cardboard or metal card stabilizer 68 employed instead. Such a tag may have instructions or other useful information printed thereon. The card may be attached to the tail of the float bomb by a cord and bridle 69.

The pyrotechnic pellet or cartridge 23 may be held centrally located by ribs 70 cut in the body 10 of the float bomb, as shown in Fig. 5, or by any other suitable spacing elements.

It will be understood that the above description and accompanying drawings comprehend only the general and preferred embodiment of the invention and that various changes in construction, proportion and arrangement of the parts may be made within the scope of the appended claims without sacrificing any of the advantages of the invention.

The invention described herein may be manufactured and/or used by or for the Government of the United States of America for governmental purposes without the payment of any royalties thereon or therefor.

We claim:

1. A float light and smoke bomb adapted to be launched from an aircraft to float upon the surface of a body of water comprising a water-tight float body having a chamber therein and a passageway for establishing communication between said chamber and the outer atmosphere, a pyrotechnic charge in said chamber, a primer for igniting said pyrotechnic charge for discharge to the atmosphere through said passageway to give a visible signal, and means slidable in said passageway in one direction for detonating said primer upon impact with the water and in an opposite direction to extend the discharge end of said means above the end of the bomb.

2. A float light and smoke bomb adapted to be launched from an aircraft to float upon the surface of a body of water comprising a water-tight float body having a chamber therein and a passageway for establishing a communication between said chamber and the outer atmosphere, a pyrotechnic charge in said chamber, an anvil, a primer on said anvil, igniting said pyrotechnic charge for discharge to the atmosphere through said passageway to give a visible signal, and a tubular hammer slidable in said passageway in one direction upon impact with the water to detonate said primer and in an opposite direction by the force of gases generated in said chamber to elevate the discharge end of said tubular hammer above the end of the bomb.

HARRY H. MOORE.
GEORGE B. DOBYNS.